Jan. 27, 1948. T. McKEE 2,435,047
DECORATED CAKE
Filed Oct. 8, 1945
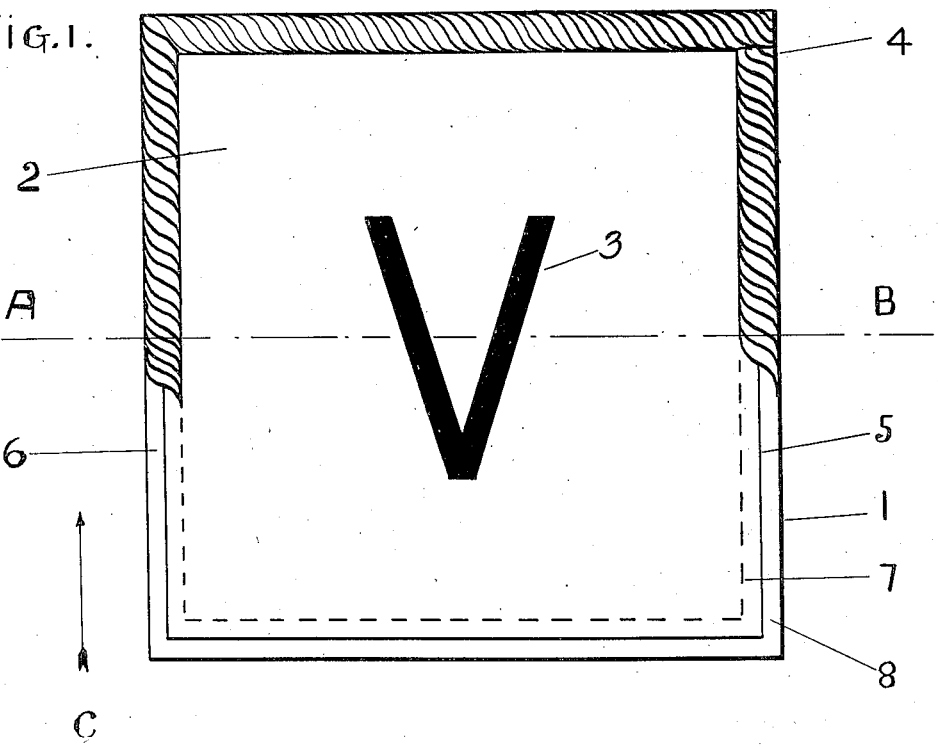
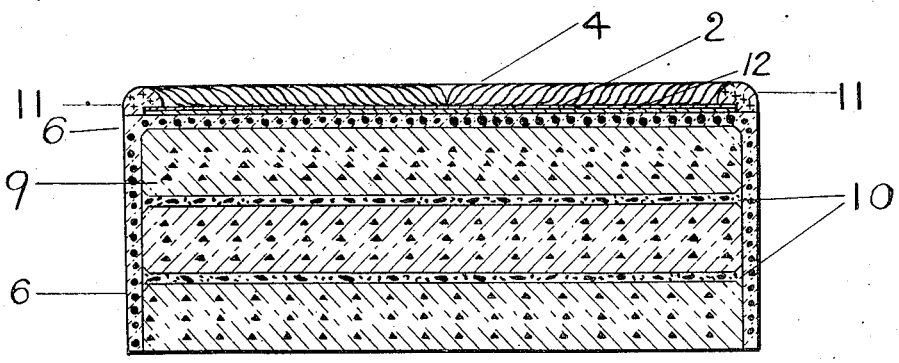
INVENTOR.
Thomas McKee Patented Jan. 27, 1948

2,435,047

UNITED STATES PATENT OFFICE 2,435,047

DECORATED CAKE

Thomas McKee, Glendale, Calif.

Application October 8, 1945, Serial No. 620,991

5 Claims. (Cl. 99—92)

My invention relates to layer cake decoration, as distinguished from edible wafer paper decoration, wherein the comparative relationship between the relative size of the decorated edible wafer paper sheet, which I employ, to the comparative size of the surface of the cake, to which the decorated sheet is attached, together form the fundamental basis on which the invention rests, plus important means which efficiently control the laws of nature disclosed in the principle of expansion or contraction, after the edible wafer paper sheet is attached to the frosting on the cakes surface, which unless properly attached and controlled results in the formation of air pockets in the underside of the wafer paper sheet.

To obtain this efficient control and prevent ruination of the outer surface of the decorated edible wafer paper sheet is one of the objects of my invention.

To decorate a layer cake or the like successfully without first placing frosting over the surface of the cake to be decorated is not practical.

Therefore after assembling the layers and placing the filling between the layers as usual I cover the surface of the cake to be decorated with plain cream frosting, as I find this type of frosting the best for my purpose.

To hold the decorated sheet to the frosting on the cake surface, I require a means to successfully anchor same. This I provide by making the size of the decorated sheet less than the area of the top surface of the frosted cake.

This results in the creation of an exposed marginal anchoring ground—all around the sheet.

To attach and hold the decorated sheet to the frosting. I cover a portion of the surface of the sheet adjacent to its periphery and also simultaneously cover over the adjacent frosted surface of the cake all around the sheet, with an ornamental border of frosting thereby attaching the sheet to the cake.

The sheet of edible wafer paper is made of any suitable material, such as from rice or wheat flour or the like and contains thereon, an ornamental design or printed reading matter, which may be imprinted thereon with an edible ink or reproduced thereon, in any suitable manner well known in the graphic arts, it being understood, that all the materials or ingredients necessary for the printing process, shall be of a harmless nature, and the surface of the printing type or block or the like, contacting the sheet shall be of a nature acceptable for the manufacture thereof, under the pure-food laws.

Edible wafer paper is produced in various thicknesses and also different types of surfaces, some forms may be about $20/1000$ to $25/1000$ of one inch thick, with however both surfaces the same, smooth with a dull face.

If this type is run through a rotary press it will probably crack or break or split, and even if printed on a "platen press" or flatbed or the like, and somehow, afterwards attached to a cake, still contains unsurmountable difficulties to make it a practical type for successful cake decoration.

There are two other grades which I consider practically useless for successful cake decoration, these two grades probably average about $12/1000$ of one inch thick.

In one both surfaces are smooth but dull finish, while in the other both surfaces are very highly polished.

I spent months experimenting with these two last grades, but found the difficulties of successfully and definitely attaching them to a cake, so they would stay put, almost unsurmountable.

Finally I used ¼ inch plate glass, placed over the sheet, to try and keep it flat, and even piled several books on top of the glass in some experiments none the less, the net result was perhaps say 95% of failures from one cause or another.

In one experiment, in spite of using the plate glass placed over the sheet, to try and attach it to a cake successfully, some four hours later, after the frosting under the edge of the sheet had dried out the edge of the sheet actually curled up, and this curling of the edge occurred so frequently that it was necessary to devise some means to prevent it. In other instances where the elapsed time was greater before inspection of the results, I found the sheet curled into practically half a circle and after this had happened several times I realized the impossibility of attaching the sheet to the cake without some other means to hold the edge down, such as I have invented.

Further, these experiments proved the necessity of providing a definite means to attach the sheet to the cake and hold it from above and also at the edge of the sheet, so that the edge would not curl up.

I found marshmallow quite unsatisfactory as the surface of the sheet eventually was ruined by the pulling power of the albumen.

While if royal icing is used, it must first be allowed to dry out and a layer of soft filling material, such as plain cream frosting, placed over it, to prevent formation of air pockets between the sheet and the icing.

In addition to providing means to hold the delicate highly sensitive wafer paper sheet to the cake, I discovered it was imperative to also use a certain type of wafer paper. The type which my experiments have proved most satisfactory is a wafer paper which has two completely different forms of surfaces, one is smooth or at least can be printed on, while the underside thereof has numerous minute indentations extending throughout its area. These indentations serve to make the sheet flexible so that it passes through a rotary printing machine satisfactorily and receives a good impression of the subject matter.

My experiments indicate edible wafer paper having the underside smooth or polished is not at all practical because no icing or frosting will successfully adhere to a smooth or polished surface and remain attached thereto after the drying out process of the frosting is completed.

Even if bakers' fondant is used, which is quite sticky, it has other most objectionable features, because the moisture will soak through to the outer surface and eventually, when the fondant dries out, result in a small wave formation on the surface and utter ruination of the sheet for decorative purposes.

This is because the wafer paper is very dry, very soft and extremely sensitive to the slightest moisture.

The underside of the wafer paper, which has the small indentations therein, when attached to the top surface of the frosted cake, lies next to the frosting thereon. The flexibility of the thin edible wafer paper sheet enables it to adapt itself much better to the surface of the frosting than smooth or polished surfaces, because the surface of the top layer of a layer cake varies, depending on the baker or the baking process or the ingredients, etc. Some bakers cut off any undue "convex curvature" to maintain a flat top for decorative purposes, while again other bakers allow the convex curvature to remain. This is also true of cakes baked by the housewife.

These minute indentations however have one disadvantage that unless the contact between the underside of the sheet and the frosting is exactly perfect and very close trouble is apt to arise. These minute indentations, unless they are controlled somehow, become small air pockets which are affected by atmospheric temperature changes, from hot to cold and vice-versa; in other words, one of the laws of nature is involved, viz. that of expansion or contraction, and becomes operative and it is necessary to overcome this law of nature to maintain a perfect outside surface in the sheet, so that the completed cake may be handled in the various changes of temperature without the top surface and decoration being ruined.

The effects of this law of nature, if the sheet is not previously treated to prevent formation of air pockets and also attached correctly to the cake, small air pockets will form eventually on great temperature changes and these will cause the surface of the sheet to expand or contract and the general appearance thereof, as it becomes uneven or small wrinkles or small waves are formed therein, completely ruins it, sometimes it may even extend to splitting or cracking or breaking open or even bulge very unduly, and once these irregularities take place, they remain and the surface is utterly ruined.

I discovered that vegetable shortening is the best material to prevent expansion or contraction of the sheet and it stands up under the most exacting tests of great changes in temperature without the slightest adverse effects accruing.

However any other suitable soft filling material can be used provided it is employed in the same way in which I use vegetable shortening. I find another very suitable filling material in the use of plain cream frosting.

In carrying out my invention, I use vegetable shortening and place a quantity, in small dabs, about the size of a pea, separated about 1½ inches apart over the entire area of the sheet on the underside thereof in which the minute indentations lie, and then rub the vegetable shortening thoroughly and carefully into the various indentations and also over the remainder of the indented surface, and afterwards place the indented side of the sheet downwards on top of the layer of plain cream frosting on the cake.

When changes in temperature exceed say about 45 degrees F. I prefer to use slightly more filler especially if the temperature is high such as 85 or 90 degrees F. or about freezing or below.

In speaking of vegetable shortening, it is naturally conceivable that if necessary some edible coloring matter may be added, to the shortening such as a very little powdered certified aniline coal tar dye, without affecting the results or functions which it performs, should the requirements of the artist's design call for a tinted or colored background in other words the addition of such tinting or coloring of this ingredient may add the required depth to the background or at least help to do so. I do not therefore restrict myself to simply plain white vegetable shortening or plain white cream frosting.

Other objects of my invention will become apparent in the following detailed description.

In the accompanying drawing, in Figure 1, I show a top plan view of a cake, decorated and arranged in accordance with my invention and having a portion of the icing or frosting removed to disclose the construction better.

Figure 2 is a section of Figure 1 taken on the line A—B looking from the direction of the arrow C.

Referring now in detail to the drawing and more particularly to Figure 1, I have shown the top plan view of a cake, represented by numeral 1 constructed and arranged in accordance with my invention and made of any suitable cake ingredients well known to the art for layer or similar cakes.

The top surface of the cake is frosted with a layer of plain white cream frosting which it will be noted contains no egg white or albumen—the frosting is shown at 6.

Overlying the greater part of the top surface of the plain white cream frosting is a sheet of edible wafer paper shown at 2—the sheet preferably is flat but flexible and has two different types of surfaces, the upper one suitable as a printing surface, while the underside thereof may be roughened or have preferably minute indentations therein, these minute indentations make the sheet flexible.

The sheet 2 is made from edible products such as from rice or wheat flour or the like, and contains thereon an ornamental design of any nature desired or printed reading matter, which may be printed thereon with non-toxic ink or placed thereon in any other suitable manner well known to the graphic arts, it being understood that all the materials or ingredients necessary for the printing process and coloring of the ink shall be of a harmless edible nature.

In Figure 1, the design or the like is represented by the large letter "V" shown at 3.

It will be noted that sheet 2, is made smaller in size than that of the top surface of the plain white cream frosting upon which it rests this principle provides an exposed marginal space between the edge of the cake as at 1 and the edge of the sheet as shown at 5.

This exposed marginal space or anchoring ground is shown at 8.

The decorated sheet is held to the cake by means of an ornamental frosting border shown at 4—while dotted lines shown at 7, indicate where the border has been removed so that the subject matter may be better understood.

Referring to Figure 2, this figure is a section of Figure 1, taken on the line A, B, in Figure 1, looked at from the direction of the arrow C.

The cake layers are shown at 9, while the filling between the layers is shown at 10, a layer of plain white cream frosting is shown at 6.

The two points where the frosting border is cut, is shown at 11—11 in section.

As I stated before, the underside of the sheet contains minute indentations, to stop the formation of small air pockets in the underside of the sheet, I rub over the underside of the decorated sheet 2, into the indentations therein and over the remainder of the indented surface—a quantity of vegetable shortening or if desired plain white cream frosting shown at 12, then I turn the surface of the sheet with the indentations therein, together with the suitable soft filling material such as vegetable shortening or plain cream frosting over and downwards and place the sheet in correct position on top of the layer of plain cream frosting shown at 6, on top of the cake.

Next I rub my forefinger over the outer surface of the decorated sheet 2, and press the sheet 2, against the layer of plain white cream frosting forcing them gently together and at the same time squeeze out all the trapped air from between the two surfaces.

To insure that the edge of the sheet 2, does not curl up and become loose or detached, I provide an ornamental border 4, of any suitable cake frosting composition known to the art, said border 4, being of sufficient width so as to overlap a portion of the sheet 2, and also the exposed marginal space shown at 8, in Figure 1, for example, the area contained between the dotted line 7, Figure 1, and the peripheral edge of the plain cream frosting as at 1 in Figure 1.

In addition to preventing the edge of the sheet 2 from curling up, the ornamental frosting border also prevents the formation of any air pockets at the periphery of the sheet and thus stops and prevents either expansion or contraction of the sheet, and ruination of its outer surface.

In the drawing I have shown my invention as utilizing a square shaped cake 1, combined with a square shaped sheet 2, but it is to be understood that any other shaped cake may be used in combination with a similarly shaped sheet—provided the relative size of the sheet is smaller than the surface of the cake to be decorated, and it is conceivable if desired that the cake may have one shape while the decorated sheet has another shape always provided a suitable exposed anchoring ground or marginal space is created between the peripheral edge of the surface of the cake and the periphery of the sheet so that the sheet may be anchored and held to the cake from above by means of the ornamental border.

While the drawing illustrates the decoration of the top of a cake, it is to be understood my invention contemplates similar decoration of the side or other walls of a cake.

In connection with the drawing, especially Figure 2, and especially the sheet 2, and the soft filling material 12, it has been necessary to enlarge both of these, in the sectional drawing, by making the width of same relatively greater in both cases, so each is distinct and separate but arranged alongside each other, so they can be illustrated clearly and distinctly and the matter better understood by doing so.

Having thus described my invention what I claim is:

1. In a cake; a layer of plain cream frosting on a surface of said cake, a decorated edible imperforate wafer paper sheet, which is flexible, and has two different forms of surfaces, one smooth the other being roughened; and a soft edible filling material rubbed over the roughened surface to prevent formation of air pockets and to prevent expansion or contraction of said sheet, the roughened side of said sheet overlying and resting on at least part of said frosted surface.

2. A cake as defined as claim 1 and wherein said other surface of the sheet is provided with very small cavities to receive said soft edible filling material.

3. In a cake; a layer of plain cream frosting on a surface of said cake, an edible decorated imperforate wafer paper sheet, which is flexible, and has two different forms of surfaces, one smooth, the other formed with very small cavities therein; and a soft edible filling material rubbed over and into said cavities, said sheet overlying and resting on at least part of said frosting layer, said filler forming means for attaching and holding said sheet to at least part of said frosted surface and for maintaining said sheet in correct position on said cake.

4. In a cake, a layer of plain cream frosting on a surface of said cake, an edible decorated imperforate wafer paper sheet, which is flexible, and has two different forms of surfaces, one smooth the other having indentations therein; and an edible soft filling material rubbed over and into said indentations to force out all air pockets therefrom; said sheet overlying and resting on at least part of said frosting layer; said filler consisting of one edible soft ingredient and said frosting layer consisting of a mixture of several different edible ingredients.

5. In a cake, a layer of plain cream frosting on a surface of said cake, an edible decorated imperforate wafer paper sheet, which is flexible, and has two different forms of surfaces, one smooth the other formed with very small cavities therein; and a soft edible filling material rubbed over and into said very small cavities, to remove all air pockets therefrom; the under surface of said sheet rests on and over at least part of said frosting layer; said sheet being closely attached by pressure to at least part of said frosting layer, thereby combining together the filler in the base of the very small cavities with at least part of the frosting layer; the very small cavities and the filler therein acting as suction cups to hold and secure said sheet to at least part of said frosting layer and preventing lateral movement of said sheet as well as distortion of the upper surface of said sheet.

THOMAS McKEE.

REFERENCES CITED

The following references are of record in the file of this patent:

UNITED STATES PATENTS

| Number | Name | Date |
| --- | --- | --- |
| 1,129,406 | Langhammer | Feb. 23, 1915 |
| 2,394,322 | McKee | Feb. 5, 1946 |